United States Patent
Tanaka et al.

(10) Patent No.: US 9,854,120 B2
(45) Date of Patent: Dec. 26, 2017

(54) OPTICAL SCANNING DEVICE AND IMAGE FORMING APPARATUS

(71) Applicant: CANON KABUSHIKI KAISHA, Tokyo (JP)

(72) Inventors: Yoshihiko Tanaka, Mishima (JP); Jun Nagatoshi, Tokyo (JP); Tetsuya Nishiguchi, Tagata-gun (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/350,446

(22) Filed: Nov. 14, 2016

(65) Prior Publication Data

US 2017/0142283 A1    May 18, 2017

(30) Foreign Application Priority Data

Nov. 18, 2015  (JP) ................................. 2015-225424
Nov. 27, 2015  (JP) ................................. 2015-231242

(51) Int. Cl.
  *G06K 15/12*   (2006.01)
  *H04N 1/113*   (2006.01)
  *H04N 1/028*   (2006.01)

(52) U.S. Cl.
  CPC ......... *H04N 1/113* (2013.01); *H04N 1/02895* (2013.01); *H04N 2201/0081* (2013.01)

(58) Field of Classification Search
  CPC ............... H04N 1/113; H04N 1/02895; H04N 2201/0081
  USPC .................................. 358/1.7, 1.5, 475, 480
  See application file for complete search history.

(56) References Cited

U.S. PATENT DOCUMENTS

| | | | |
|---|---|---|---|
| 5,003,614 A | 3/1991 | Tanaka et al. | 382/171 |
| 6,473,113 B1 | 10/2002 | Uzuki | 347/257 |
| 6,856,338 B2 | 2/2005 | Takahashi et al. | 347/225 |
| 6,969,846 B2 | 11/2005 | Tanaka et al. | 250/239 |
| 9,128,291 B2 | 9/2015 | Nagatoshi et al. | G03G 15/043 |

(Continued)

FOREIGN PATENT DOCUMENTS

| | | |
|---|---|---|
| JP | H05-313052 | 11/1993 |
| JP | H08-021936 | 1/1996 |

(Continued)

OTHER PUBLICATIONS

U.S. Appl. No. 15/261,484, filed Sep. 9, 2016.

*Primary Examiner* — Cheukfan Lee
(74) *Attorney, Agent, or Firm* — Fitzpatrick, Cella, Harper & Scinto

(57) ABSTRACT

An optical scanning apparatus includes a deflector for scanningly deflecting a beam; a scanning lens for imaging the beam deflected by the deflector on a surface; a casing for a light source, the deflector and the lens; and an elastic member urging the lens toward the casing along an optical axis. The lens is provided with an abutment at a beam emergent side of the lens, the abutment abutting to the casing, and is provided with a limiting portion at a side opposite from the emergent side, the limiting portion limiting movement in the opposite direction. The elastic member and the limiting portion limits the movement of the lens in the direction opposite to the direction of the lens. When the lens contacts a positioning portion of the casing, a gap is provided between the elastic member and the limiting portion with respect to the direction.

5 Claims, 12 Drawing Sheets

(56) References Cited

U.S. PATENT DOCUMENTS

| | | | | |
|---|---|---|---|---|
| 2002/0075916 A1* | 6/2002 | Sato | ............... | G02B 7/025 |
| | | | | 372/36 |
| 2006/0066712 A1* | 3/2006 | Sakai | ............... | B41J 2/473 |
| | | | | 347/244 |
| 2007/0019269 A1* | 1/2007 | Itabashi | ............... | G02B 26/123 |
| | | | | 359/196.1 |
| 2007/0159674 A1* | 7/2007 | Tomita | ............... | H04N 1/032 |
| | | | | 359/201.1 |
| 2008/0240786 A1* | 10/2008 | Hwang | ............... | G02B 7/025 |
| | | | | 399/220 |
| 2010/0033790 A1* | 2/2010 | Obara | ............... | B41J 2/473 |
| | | | | 359/204.1 |
| 2010/0328413 A1* | 12/2010 | Otoguro | ............... | G02B 7/028 |
| | | | | 347/224 |
| 2013/0188234 A1* | 7/2013 | Matsuura | ............... | G02B 26/10 |
| | | | | 359/205.1 |
| 2014/0158874 A1* | 6/2014 | Kusuda | ............... | G02B 26/10 |
| | | | | 250/234 |
| 2014/0168737 A1* | 6/2014 | Murotani | ............... | G02B 26/123 |
| | | | | 359/204.1 |
| 2015/0338768 A1 | 11/2015 | Nagatoshi et al. | .. | G02B 26/129 |
| 2016/0131896 A1 | 5/2016 | Nakamura et al. | | G03G 15/0409 |
| 2016/0171350 A1 | 6/2016 | Kobayashi et al. | ............... | H04N 1/00814 |

FOREIGN PATENT DOCUMENTS

| | | |
|---|---|---|
| JP | 2001-100133 | 4/2001 |
| JP | 2001-324692 | 11/2001 |
| JP | 2007-225680 | 9/2007 |
| JP | 4325419 B2 | 9/2009 |

* cited by examiner (a)

(b)

(a) REGULAR POSITION (b) fθ-LENS 70 IS MOVED (c) ANAMORPHIC COLLIMATOR LENS 20 IS MOVED

OPTICAL SCANNING DEVICE AND IMAGE FORMING APPARATUS

FIELD OF THE INVENTION AND RELATED ART

The present invention relates to an optical scanning device which is used by an electrophotographic image forming apparatus such as an electrophotographic copying machine and an electrophotographic printer. It relates also to an image forming apparatus equipped with the optical scanning device.

A conventional optical scanning device employed by an electrophotographic image forming apparatus such as a laser printer emits a beam of laser light from its light source while modulating the beam with image formation signals. It deflects the beam with the use of a light deflecting device having a rotational polygonal mirror, in such a manner that as the beam of laser light is deflected, it forms an electrostatic latent image on the peripheral surface of the photosensitive drum by being made to focus on the peripheral surface of the photosensitive drum by such a scanning lens as an fθ lens. Then, the electrostatic latent image on the peripheral surface of the photosensitive drum is developed by a developing device into a visible image (image formed of toner). Then, the visible image (toner image) is transferred onto a sheet of recording medium such as recording paper. Thereafter, the sheet is sent to a fixing device, in which the toner on the sheet is thermally fixed to the sheet, to yield a print (permanent image).

The scanning lens is held by an optical box, which is a boxy shell. In the case of the scanning device disclosed in Japanese Laid-open Patent Application No. 2001-100133, for example, the scanning lens is held to the optical box with an independent leaf spring, so that it is pressed in both the direction parallel to the optical axis of the scanning lens and the direction parallel to the height direction of the lens.

In the case of the optical scanning device disclosed in Japanese Laid-open Patent Application No. 2007-225680, the scanning lens is held to the optical box by a springy retainer (snap-fit) which is one of integral parts of the optical box. In this case, the scanning lens is pressed in the direction parallel to its optical axis by the springy retainer. As for the positioning of the scanning lens in terms of the direction parallel to the height direction of the lens, the optical box is provided with a stair-step to prevent the lens from deviating out of the preset range.

In the case of the optical scanning device disclosed in Japanese Patent No. 4,325,419, the direction in which the scanning lens is pressed by the springy retainer is made to fall between the direction parallel to its optical axis and the secondary scan direction, so that the scanning lens can be pressed in both the direction parallel to its optical axis and the secondary scan direction by the springy retainer. By the way, it is needless to say that "secondary scan direction" is the direction which is parallel to the height direction of the scanning lens.

However, the above-described examples of conventional optical scanning device suffer from the following issues. In a case where a scanning lens is fixed to an optical box with the use of an independent leaf spring as disclosed in Japanese Laid-open Patent Application No. 2001-100133, the leaf spring has to be attached after the scanning lens is disposed in the optical box. Thus, this arrangement requires additional steps to assemble the device. Further, the scanning lens is pressed by the leaf spring in both the direction parallel to its optical axis and the direction parallel to its height direction. Thus, if the amount of force applied to the scanning lens by the leaf spring deviates from the preset value, and/or the direction in which the scanning lens is pressed by the leaf spring deviate from the preset one, it is possible that an fθ lens will be subjected to a certain amount of moment, and therefore, the fθ lens will not be held in a desired attitude.

From the standpoint of reducing an optical scanning device in component count, the springy retainer is desired to be an integral part of the optical box. Thus, the optical box (springy retainer) is structured as disclosed in Japanese Laid-open Patent Application No. 2007-225680. In this case, however, the scanning lens is fixed to the optical box with the use of adhesive to prevent the lens from shifting in the direction parallel to the secondary scan direction. Thus, it adds to the number of steps required to assemble the device, and also, it is possible that the position of the lens is affected by the changes in the ambience.

Further, in the case of an optical scanning device structured as disclosed in Japanese Patent No. 4,325,419, the springy retainer portion pressed on a part of the concaved surface of the scanning lens. Thus, the pressing force generated by the springy retainer portion is divided into the force parallel to the optical axis of the lens, and the direction parallel to the secondary scan direction. Therefore, if the force generated by the springy retainer portion in the direction parallel to the height direction of the lens becomes larger than the force generated by the retainer portion in the direction parallel to the optical axis of the lens, it is possible that the lens will not be pressed in the direction parallel to its optical axis by a sufficient amount of force, and therefore, will fail to remain satisfactorily pressed on the positional referential surface. Further, if the springy retainer portion is increased in the amount of force it generates in the direction parallel to the optical axis of the lens, it is reduced in the amount of force it applies to the lens in the direction parallel to the height direction of the lens. Thus, if the optical scanning device happens to be subjected to an impact parallel to the height direction of the lens, the lens will deviate in its height direction.

SUMMARY OF THE INVENTION

Thus, the primary object of the present invention is to provide an optical scanning device which is capable of highly precisely positioning, and keeping highly precisely positioned, its scanning lens relative to its casing (boxy shell) even if it is subjected to physical impacts during its shipment or in the like situation, and yet, is no greater in the number of assembly steps than any conventional optical scanning device.

According to an aspect of the present invention, there is provided an optical scanning apparatus comprising a light source; a deflector configured to scanningly deflect a beam emitted from said light source; a scanning lens configured to image the beam deflected by said deflector on a surface to be scanned; a casing accommodating said light source, said deflector and said scanning lens; and an elastic member for urging said scanning lens toward said casing in a direction of an optical axis, wherein said scanning lens is provided with an abutment surface at a beam emergent side of said scanning lens, said abutment surface abutting to said casing, and is provided with a limiting portion at a side opposite from a beam emergent side, said limiting portion limiting movement of said scanning lens in a direction opposite to a assembling direction of said scanning lens, wherein said elastic member as well as said limiting portion limits the movement of said scanning lens in the direction opposite to the assembling direction of said scanning lens, and wherein in a state that said scanning lens contacts a positioning portion of said casing with respect to the assembling direction, a gap is provided between said elastic member and said limiting portion with respect to the assembling direction.

According to another aspect of the present invention, there is provided an optical scanning apparatus comprising a light source; a deflector configured to scanningly deflect a beam emitted from said light source; a scanning lens configured to image the beam deflected by said deflector on a surface to be scanned; a casing accommodating said light source, said deflector and said scanning lens; and an elastic member for urging said scanning lens toward said casing in a direction of an optical axis, wherein said scanning lens is provided with an abutment surface at a beam emergent side of said scanning lens, said abutment surface abutting to said casing, and wherein a free end portion of said elastic member and a top surface of said scanning lens limit movement of said scanning lens in a direction opposite a assembling direction of said scanning lens, and wherein in a state that said scanning lens contacts a positioning portion of said casing with respect to the assembling direction, a gap is provided between the free end portion of said elastic member and the top surface of said scanning lens with respect to the assembling direction.

Further features of the present invention will become apparent from the following description of exemplary embodiments with reference to the attached drawings.

Figure 7:
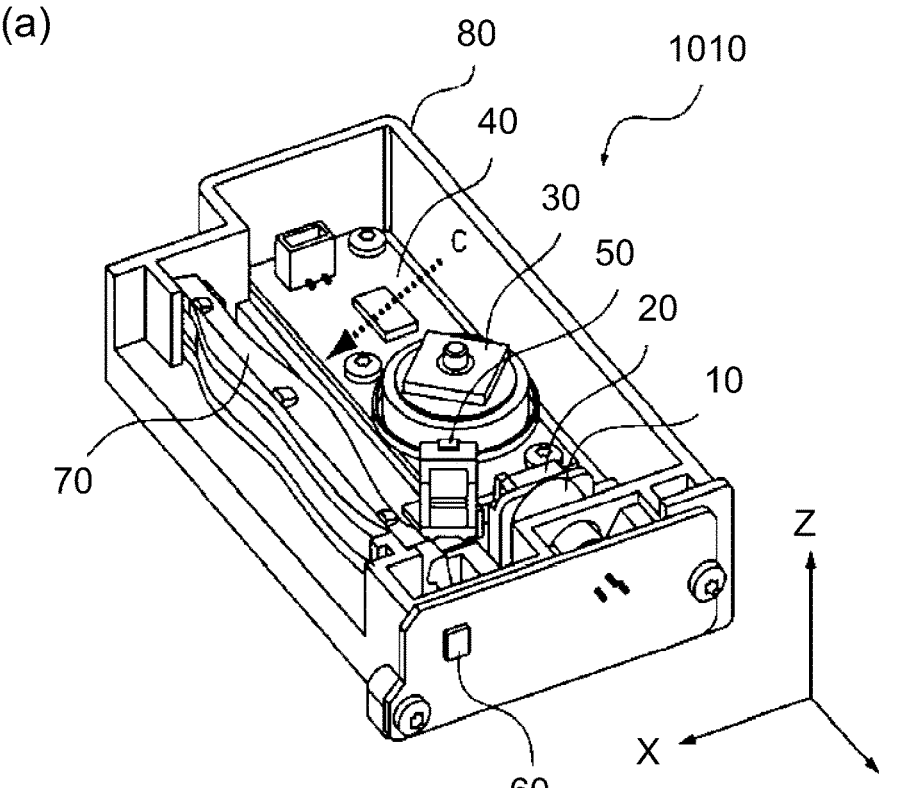
Figure 7:
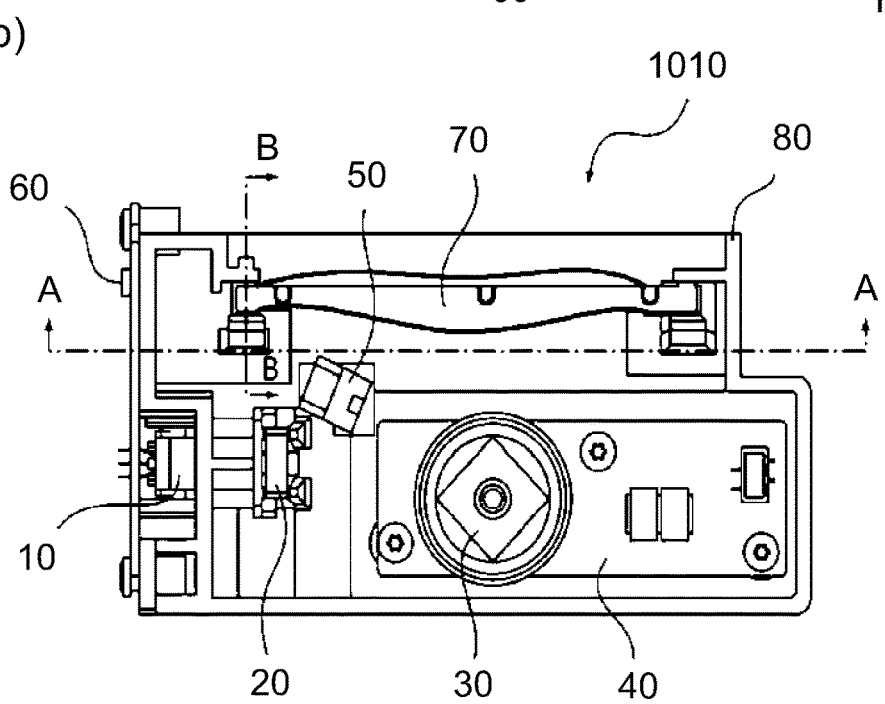

Part (a) of FIG. 7 is a perspective view of the optical scanning device in the third embodiment of the present invention, and part (b) of FIG. 7 is a plan view of the optical scanning device.

Figure 8:
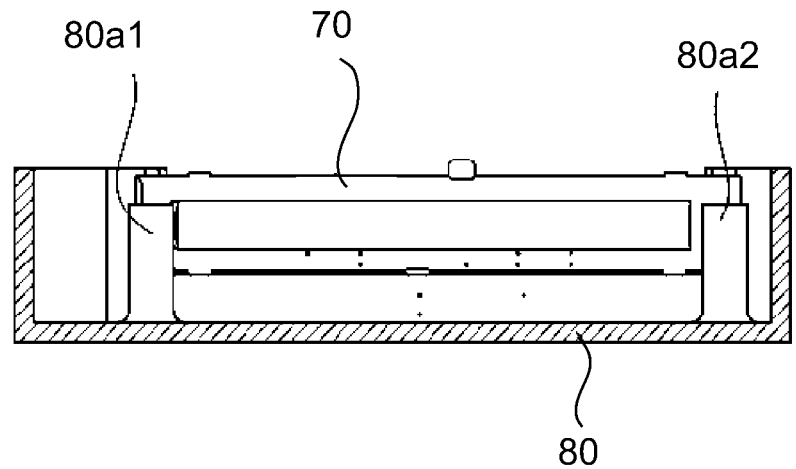

FIG. 8 is a sectional view of a combination of the fθ lens, springy retaining portion, and their adjacencies, at a plane A-A in part (a) of FIG. 7, which is for showing the relationship between the fθ lens and springy retaining portions.

Figure 9:
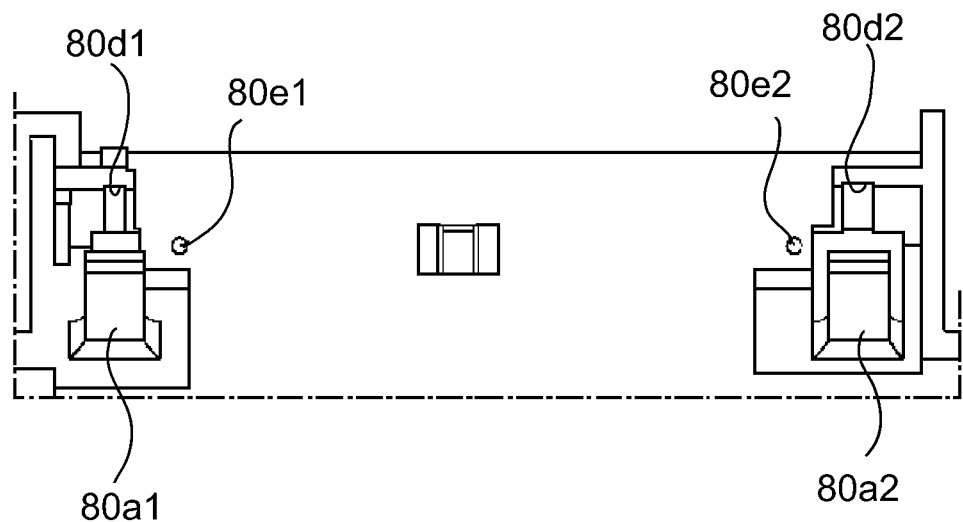

FIG. 9 is a schematic drawing for showing the positional relationship between the referential surface of the optical box in terms of the direction Z in part (a) of FIG. 7, and springy retaining portion, as seen from the direction indicated by an arrow mark C in part (a) of FIG. 7, prior to the insertion of the fθ lens into the optical box.

Figure 10:
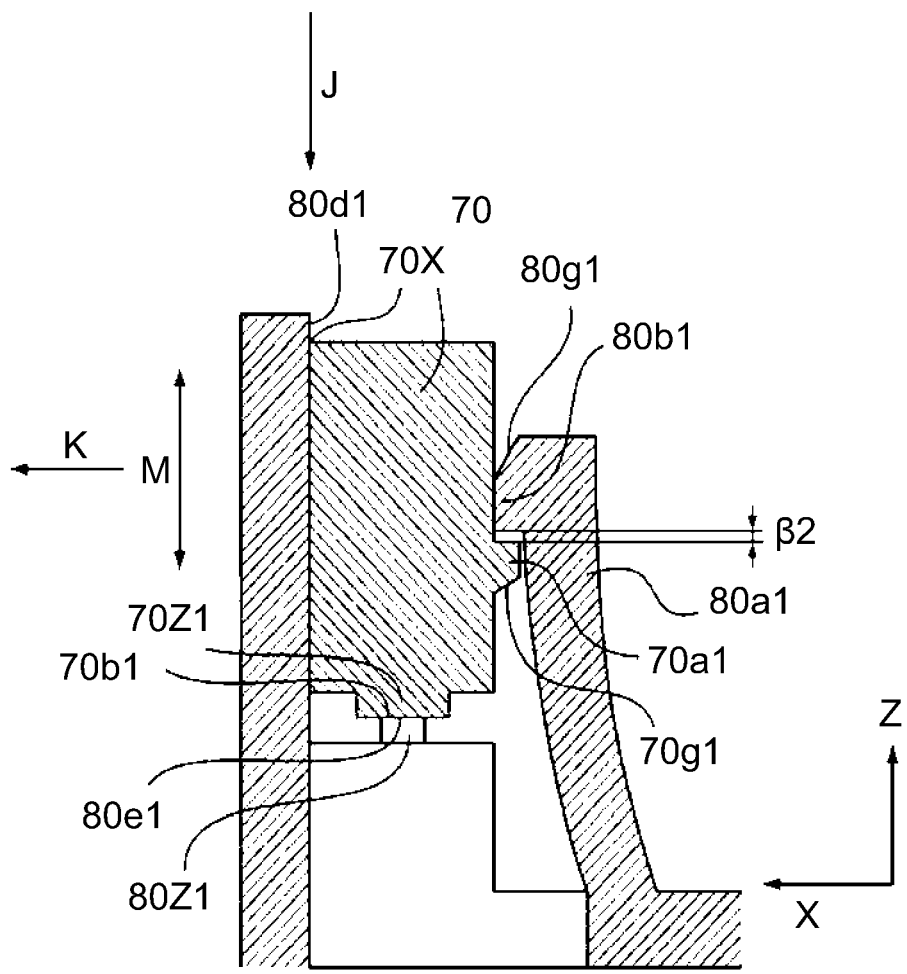

FIG. 10 is a sectional view of a combination of the springy retaining portion, fθ lens, and its adjacencies, at a plane B-B in part (b) of FIG. 7.

Figure 11:
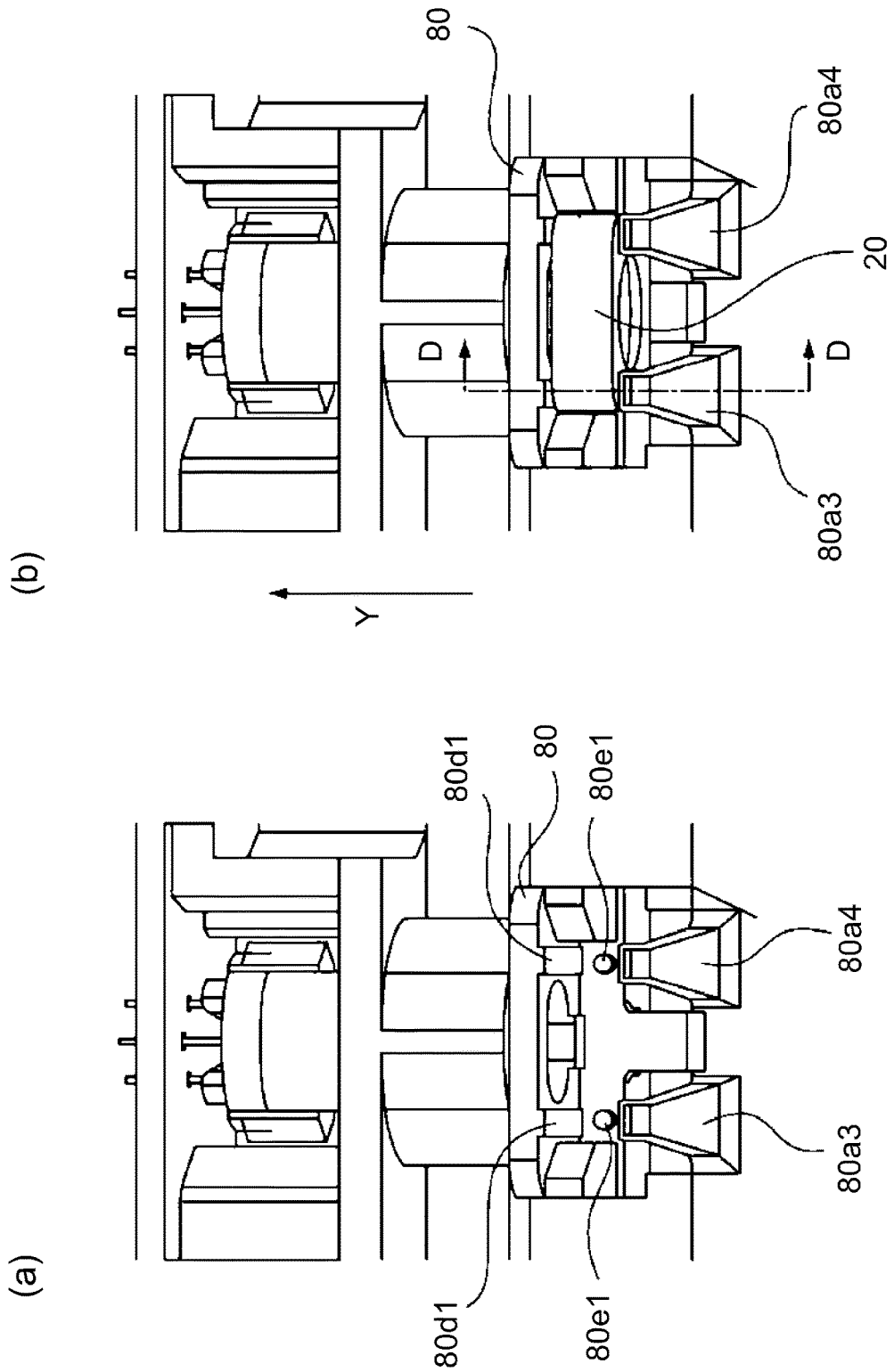

Part (a) of FIG. 11 is a perspective view of the portion of the optical scanning device, related to the present invention, in the second embodiment, prior to the attachment of the anamorphic collimator lens to the optical box, whereas part (b) of FIG. 11 is a perspective view of the portion of the optical scanning device, related to the present invention, in the second embodiment, after the attachment of the anamorphic collimator lens to the optical box.

Figure 12:
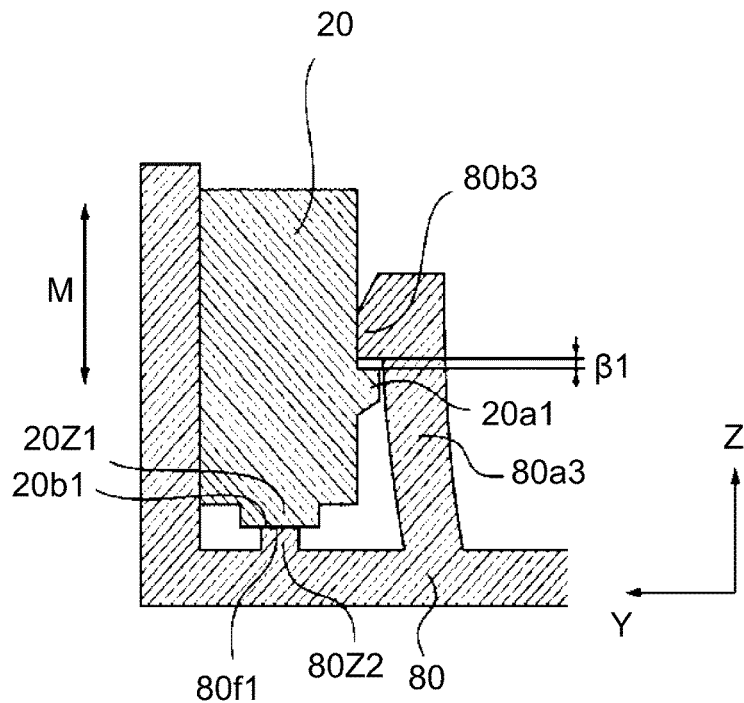

FIG. 12 is a sectional view of a combination of the anamorphic collimator lens, springy retaining portion, and their adjacencies, at a plane D-D in part (b) of FIG. 11.

Figure 13:
Figure 13:
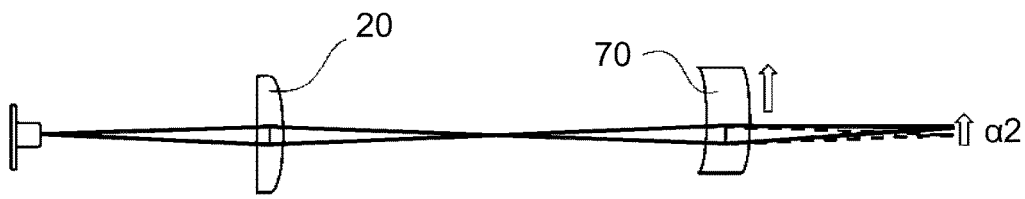
Figure 13:
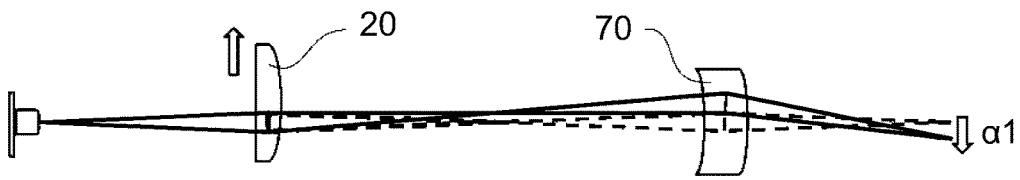

FIG. 13 is a schematic drawing for showing the relationship between the amount of movement of the springy retaining portion and fθ lens, and the amount of movement of the point of focus of the beam of laser light.

Figure 14:
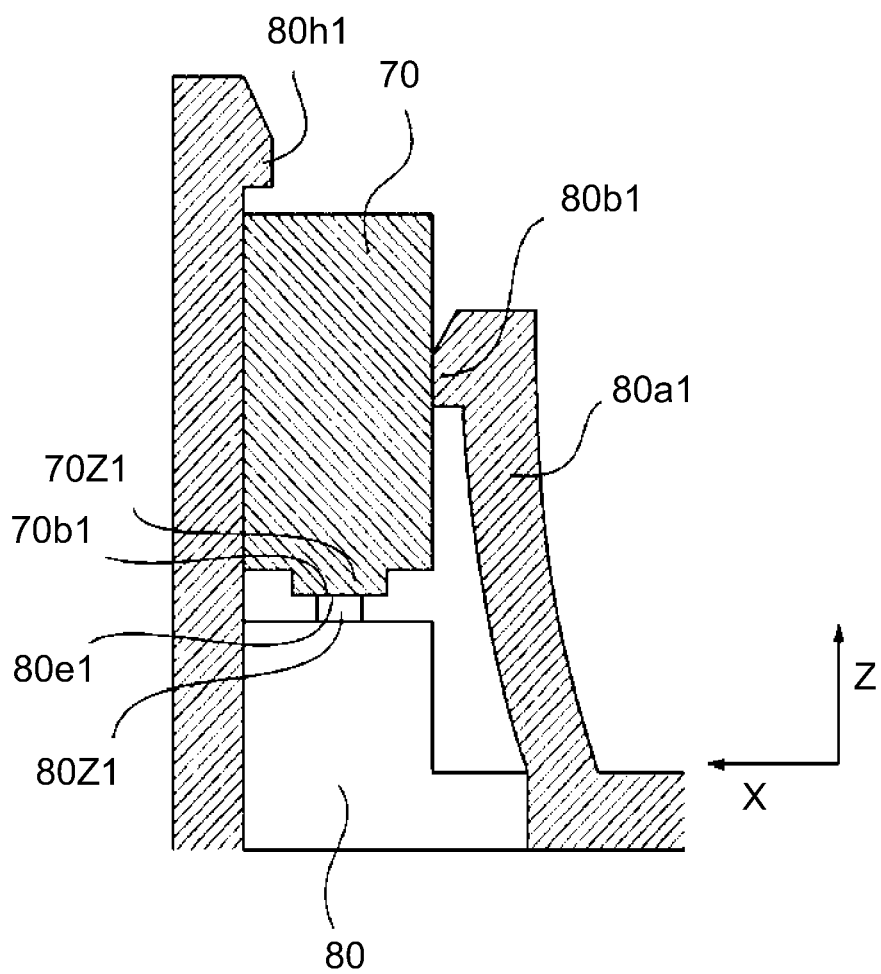

FIG. 14 is a sectional view of the springy retaining portion, and the portion of the optical box, to which the fθ lens is attached.

DESCRIPTION OF THE EMBODIMENTS

Hereinafter, the present invention is described in detail with reference to a few of the embodiments of the present invention. However, the measurements, materials, shapes of the structural components of the image forming apparatus and optical scanning device in each embodiment, and the positional relationship among the structural components, are not intended to limit the present invention in scope, unless specifically noted. That is, the present invention is also applicable to image forming apparatus and optical scanning devices, other than those in the following embodiments, which are different in structure and conditions from those in the following embodiments. By the way, regarding the referential codes for the structural components and portions thereof, if a structural component, or a portion thereof, in the second embodiment and thereafter, has the same referential code as the counterparts in the first embodiment, their description is the same as the description of the counterparts in the first embodiment.

Embodiment 1

[Image Forming Apparatus]

Figure 1:
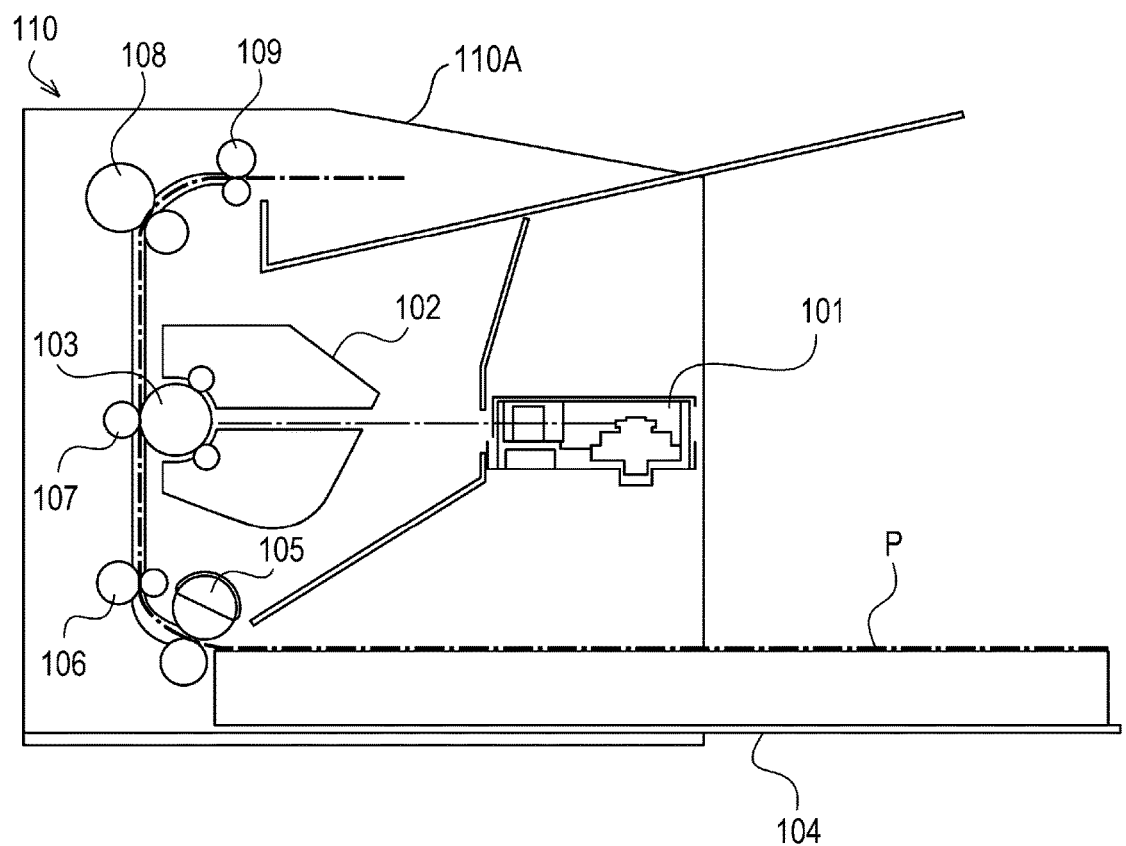
FIG. 1 is a sectional view of an image forming apparatus equipped with the optical scanning device in the first embodiment of the present invention.

FIG. 1 is a sectional view of the image forming apparatus 110 which is equipped with the optical scanning device 101 in the first embodiment. The image forming apparatus 110 is provided with the optical scanning device 101. It is an image forming apparatus equipped with an image forming means which scans the photosensitive drum 103, as "image bearing member", with the use of its optical scanning device 101 to form an electrostatic latent image on the photosensitive drum 101, and then, forms an image on a sheet P of recording medium such as recording paper, based on the electrostatic latent image on the photosensitive drum 101. Here, the image forming apparatus 110 is described as a printer.

The image forming apparatus 110 (printer) employs a process cartridge 102 in which the photosensitive drum 103 is disposed. It projects a beam of laser light with the use of its optical scanning device 101, as an exposing means, while modulating the beam with obtained image information, in such manner than the beam scans the peripheral surface of the photosensitive drum 103. Consequently, a latent image is effected on the photosensitive drum 103. This latent image is developed by the process cartridge 102, with the use of toner as developer, into a visible image (toner image), which is an image formed of toner. By the way, "process cartridge 102" is a means for processing the photosensitive drum 103. It is an integral combination of a charging means, a developing means, etc.

Meanwhile, sheets P of recording medium layered upon a recording medium bearing plate 104 are conveyed one by one by a feed roller 105 into the main assembly of the image forming apparatus 110. Then, each sheet P is conveyed further downstream by an intermediary roller 106. As the sheet P is conveyed further downstream, the toner image formed on the photosensitive drum 103 is transferred onto the sheet P by a transfer roller 107. Then, the sheet P, on which unfixed toner image is present, is conveyed further downstream into a fixing device 108 which internally holds a heating member. Then, while the sheet P is conveyed through the fixing device 108, the unfixed toner image on the sheet P is fixed to the sheet P. Thereafter, the sheet P is discharged from the main assembly 110A of the image forming apparatus 110 by a pair of discharge rollers 109.

By the way, in this embodiment, the aforementioned charging means and developing means, which are means for processing the photosensitive drum 103, are disposed, along with the photosensitive drum 103, in the process cartridge 102. However, each processing means may be independently disposed from the photosensitive drum 103.

[Optical Scanning Device]

Figure 2:
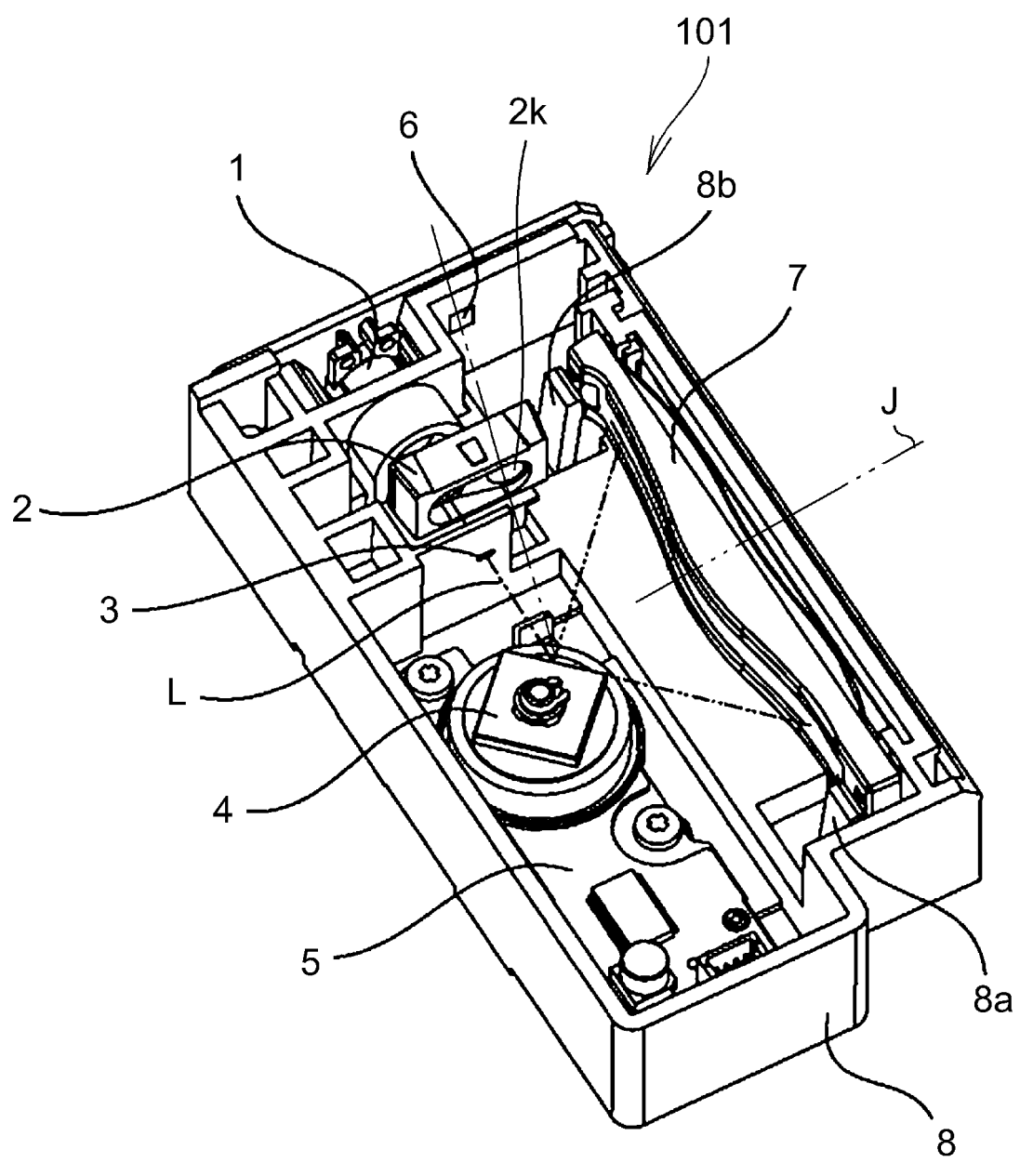
FIG. 2 is a perspective view of the optical scanning device in the first embodiment.

FIG. 2 is a perspective view of the optical scanning device 101. The optical scanning device 101 has an optical box 8, which internally holds a laser unit 1, a deflecting device 5, and an fθ lens 7. That is, the laser unit 1, an anamorphic collimator lens 2, an iris 3, the deflecting device 5 having a rotational polygonal mirror 4, a signal detection sensor 6, the fθ lens 7 (scanning lens) are disposed in the optical box 8.

The laser unit 1 (semiconductor laser unit), which is a light source, is such a unit that emits a beam of laser light. The anamorphic collimator lens 2 is an integration of a collimator lens, a cylindrical lens, and the signal detection lens (or BD lens). The deflecting device 5 has the rotational polygonal mirror 4 which deflects the beam of laser light emitted by the laser unit 1, in such a manner that as the beam of laser light is deflected by the rotating polygonal mirror 4, the beam of laser light oscillatorily moves in a manner to sweep the surface of the object it illuminates. It rotationally drives the rotational polygonal mirror 4.

In terms of the primary scan direction, as the beam L of laser light is emitted from the laser unit 1, it is converted into roughly parallel or convergent light by the anamorphic collimator lens 2, whereas in terms of the secondary scan direction, the beam L is converted into convergent light by the anamorphic collimator lens 2. Then, the beam L of laser light is transmitted though the iris 3 while being controlled in width, so that as it hits the reflective surface of the rotational polygonal mirror 4, it extends in the direction parallel to the primary scan. As the rotational polygonal mirror 4 is rotated, the beam L of laser light is deflected in a manner to scan the object it hits (illuminates), and enters the BD lens portion 2k of the anamorphic collimator lens 2. As it transmits through the BD lens portion 2k, it hits (illuminates) the signal detection sensor 6.

As the beam L of laser light hits the signal detection sensor 6, it is detected by the sensor 6. The timing with which the beam L is detected by the signal detection sensor 6 coincides with the timing with which the beam L begins to scan the peripheral surface of the photosensitive drum 103 in the primary scan direction. Then, the beam L of laser light enters the fθ lens. The fθ lens 7, which functions as a "scanning lens" is such a lens that focuses the beam L of laser light on the peripheral surface of the photosensitive drum 103, that is, the surface to be scanned, as the beam L of laser light is deflected by the deflecting device 5 in manner to scan the peripheral surface of the photosensitive drum 103. That is, the fθ lens 7 focuses the beam L of laser light in such a manner that the beam L forms a spot on the peripheral surface of the photosensitive drum 103, while keeping steady the speed with which the spot scans the peripheral surface of the photosensitive drum 103. The fθ lens 7 having the above-described characteristics is an aspherical lens. After transmitting through the fθ lens 7, the beam L of laser light comes out of the opening of the optical box 8, and scans the peripheral surface of the photosensitive drum 103 while remaining focused, as a spot, on the peripheral surface of the photosensitive drum 103.

Figure 3:
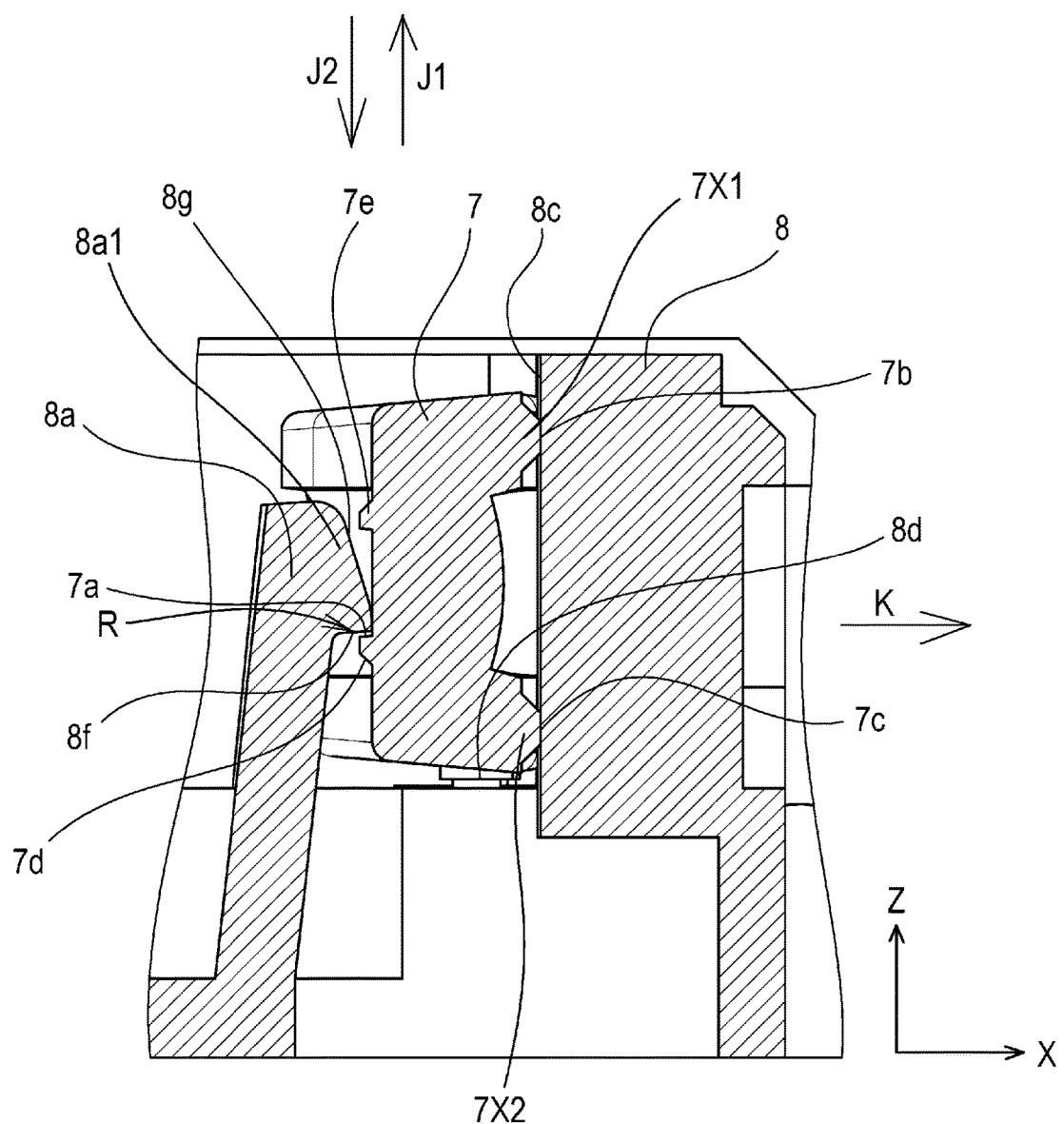
FIG. 3 is a sectional view of a combination of the springy retainer portion (snap-fit) and fθ lens of the optical scanning device in the first embodiment, at a plane X-Z in FIG. 2.

That is, the beam L of laser light is deflected by the rotational polygonal mirror 4 in a manner to scan the peripheral surface of the photosensitive drum 103 in the primary scan direction (parallel to rotational axis of photosensitive drum 103). While the peripheral surface of the photosensitive drum 103 is scanned by the beam L of laser light in the primary scan direction, the photosensitive drum 103 is being rotationally driven. Thus, the peripheral surface of the photosensitive drum 103 is scanned by the beam L of laser light also in the secondary scan direction. Consequently, an electrostatic latent image is effected on the peripheral surface of the photosensitive drum 103. The fθ lens 7 is fixed to the optical box 8 by a pair of springy retaining (snap-fit) portions 8a and 8b. FIG. 3 is a sectional view of a combination of the springy retaining portion 8a and fθ lens 7 of the optical scanning device 101 in the first embodiment, at a plane X-Z in FIG. 2. The fθ lens 7 has a pair of protrusions 7X1 and 7X2, which are protrusive in the direction indicated by an arrow mark X. In terms of the direction indicated by an arrow mark Z, a preset amount of distance is provided between the protrusions 7X1 and 7X2.

The optical box 8 has a referential surface 8c, which is flat and parallel to the direction Z.

The springy retaining portion 8a, which is an "elastic portion", is an integral part of the optical box 8. The springy retaining portion 8a has a protrusion 8a1 which is protrusive in the arrow mark X direction.

The fθ lens 7 has a pair of referential surfaces 7b and 7b as bumping surfaces, which are at the downstream end of the fθ lens 7 in terms of the direction in which the beam L of laser light transmits through the fθ lens 7. The optical box 8 has the referential surface 8c as a catching surface which catches the referential surfaces 7b and 7c. As the fθ lens 7 is inserted into the optical box 8, the referential surfaces 7b and 7c bump into (come into contact with) the referential surface layer 8c of the optical box 8. The protrusion 8a1 presses the fθ lens 7 against the optical box 8 in the direction parallel to the optical axis K (arrow mark X direction). The fθ lens 7 remains pressed against the referential surface layer 8c of the optical box 8 by the protrusion 8a1 (of springy retaining portion 8a), remaining thereby properly positioned relative to the optical box 8.

Further, the optical box 8 has a referential surface 8d, as a "positioning portion", for positioning the fθ lens 7 in terms of the arrow Z direction as the fθ lens 7 is inserted into the optical box 8 in the direction indicated by an arrow mark J2. That is, as the fθ lens 7 is inserted into the optical box 8 in the arrow J2 direction, the fθ lens 7 comes into contact with the Z referential surface 8d, whereby it is precisely positioned in terms of the direction Z.

As for the means for preventing the fθ lens 7 from slipping out of the optical box 8 in the arrow mark Z direction, the fθ lens 7 is prevented from slipping out of the optical box 8 by a combination of the protrusion 7a of the fθ lens 7 and the protrusion 8f of the springy retaining portion 8a. That is, a combination of the protrusion 8f of the springy retaining portion 8a and the protrusion 7a of the fθ lens 7 regulates the amount by which the fθ lens 7 is allowed to move in the direction indicated by the arrow mark J1, which is opposite from the direction indicated by the arrow mark J2, and in which the fθ lens 7 is inserted into the optical box 8. Further, the fθ lens 7 has a protrusion 7a, as a "regulating portion", which is on the opposite side of the fθ lens 7 from the X referential surfaces 7b and 7c, and regulates the amount by which the fθ lens 7 is allowed to move in the arrow mark J1 direction, which is opposite from the arrow mark J2 direction in which the fθ lens 7 is inserted into the optical box 8.

When the fθ lens 7 is in contact with the Z referential surface 8d, there is provided roughly 0.1-0.2 mm gap R (clearance) between the protrusion 7a of the fθ lens 7 and the protrusion 8f of the springy retaining portion 8a, in terms of the lens insertion direction J2 (parallel to direction indicated by arrow mark Z).

That is, the force applied to the fθ lens 7 by the protrusion 8f of the springy retaining portion 8a works only in the direction indicated by the arrow mark X. Therefore, it is possible to ensure that the X referential surfaces 7b and 7c of the fθ lens 7 come into, and remain in contact with, the X referential surface layer 8c of the optical box 8, and therefore, to precisely dispose the fθ lens 7 in a preset position. By the way, it is possible for the fθ lens 7 to be moved in the arrow mark Z direction by an amount equal to the abovementioned clearance. However, the optical scanning device 101 is designed so that even if the fθ lens 7 moves in the arrow mark Z direction, it functions as an optical system capable of keeping the change in the image quality of the image forming apparatus 110 within a tolerable range.

Further, the protrusion 7a of the fθ lens 7 is provided with a slanted surface 7d, which faces the protrusion 8f of the springy retaining portion 8a immediately before the insertion of the fθ lens 7 into the optical box 8. Thus, when the fθ lens 7 is inserted into the optical box 8 from the top side of the optical box 8, the slanted surface 7d comes into contact with the slanted surface 8g of the springy retaining portion 8a, allowing the fθ lens 7 to smoothly (without hanging up at protrusion 8g) slide into the optical box 8.

By the way, the fθ lens 7 has another protrusion 7e. In FIG. 2, the direction from which the beam L of laser light is made to enter the deflecting device 5 is the top left of the deflecting device 5. If it is assumed here that the optical scanning device 101 is structured so that the direction in which the beam L of laser light is made to enter the deflecting device 5 is the bottom right, for example, the fθ lens 7 has to be flipped upside down to be inserted into the optical box 8 (in plan view, fθ lens 7 is not symmetrical with reference to hypothetical line J). Thus, the protrusion 7e is made to play the role of preventing the fθ lens 7 from slipping out of the optical box 8 in the arrow mark Z direction.

Figure 4:
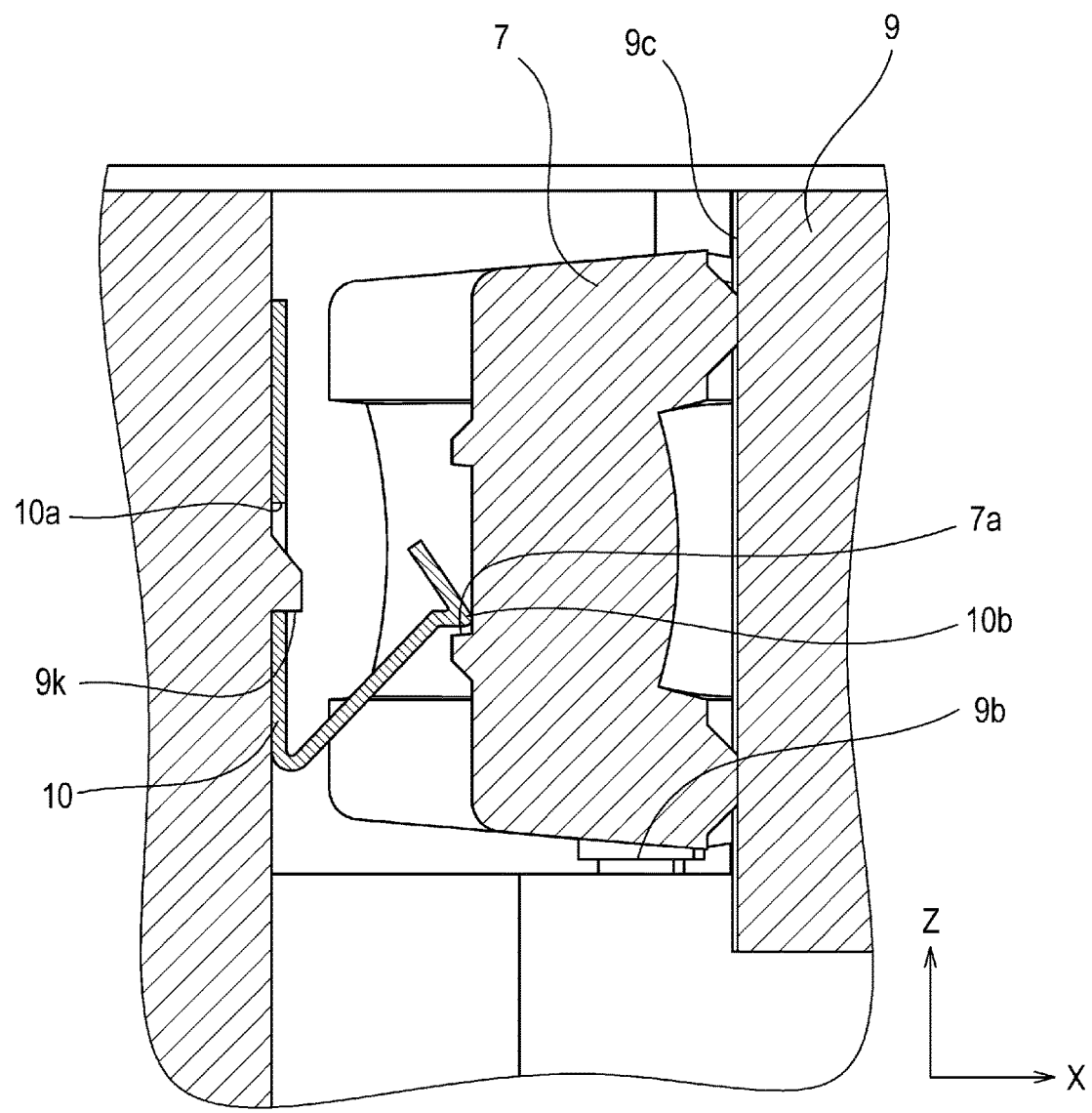
FIG. 4 is a sectional view of a combination of the springy retaining portion and fθ lens of one of the modified versions of the optical scanning device in the first embodiment, at the plane X-Z in FIG. 2.

FIG. 4 is a combination of a springy member 10 and fθ lens 7, and its adjacencies, in one of the modified versions of this embodiment, at a plane X-Z in FIG. 2. In order to precisely position, and keep precisely position, the fθ lens 7 relative to the X referential surface 9c and Z referential surface 9b of the optical box 9, the optical scanning device is provided the springy member 10 made of stainless steel is provided. The springy member 10 is provided with a hole 10a. It is fixed to the optical box 9 (precisely position relative to optical box 9) so that in terms of the arrow mark Z direction, the bottom side of the edge of its hole 10a is in contact with the bottom side of the protrusion 9k of the optical box 9. With the springy member 10 being fixed to the optical box 9 as described above, the pressing portion 10b of the springy member 10 presses on the fθ lens 7 in the arrow mark X direction. Thus, the fθ lens 7 is precisely positioned in terms of the arrow mark X direction.

Further, a combination of the pressing portion 10b and the protrusion 7a of the fθ lens 7 prevents the fθ lens 7 from slipping out of the optical box 9 in the arrow mark Z direction. There is provided roughly 0.1-0.2 mm of gap R (clearance) between the pressing portion 10b and the protrusion 7a of the fθ lens 7. In this embodiment, the springy member 10 is a metallic spring, and is not an integral part of the optical box 9. Therefore, if it becomes necessary to remove the fθ lens 7 during the assembly of the optical scanning device, for example, the fθ lens 7 can be easily removed without damaging other components.

As described above, the pressing portion 10b does not generate such force that presses the fθ lens 7 in the arrow mark Z direction. Therefore, it is possible to ensure that the fθ lens 7 comes into contact, and remains in contact with, the X referential surface 9c of the optical box 9, and the fθ lens 7 is precisely disposed in attitude as well as position.

Embodiment 2

Figure 5:
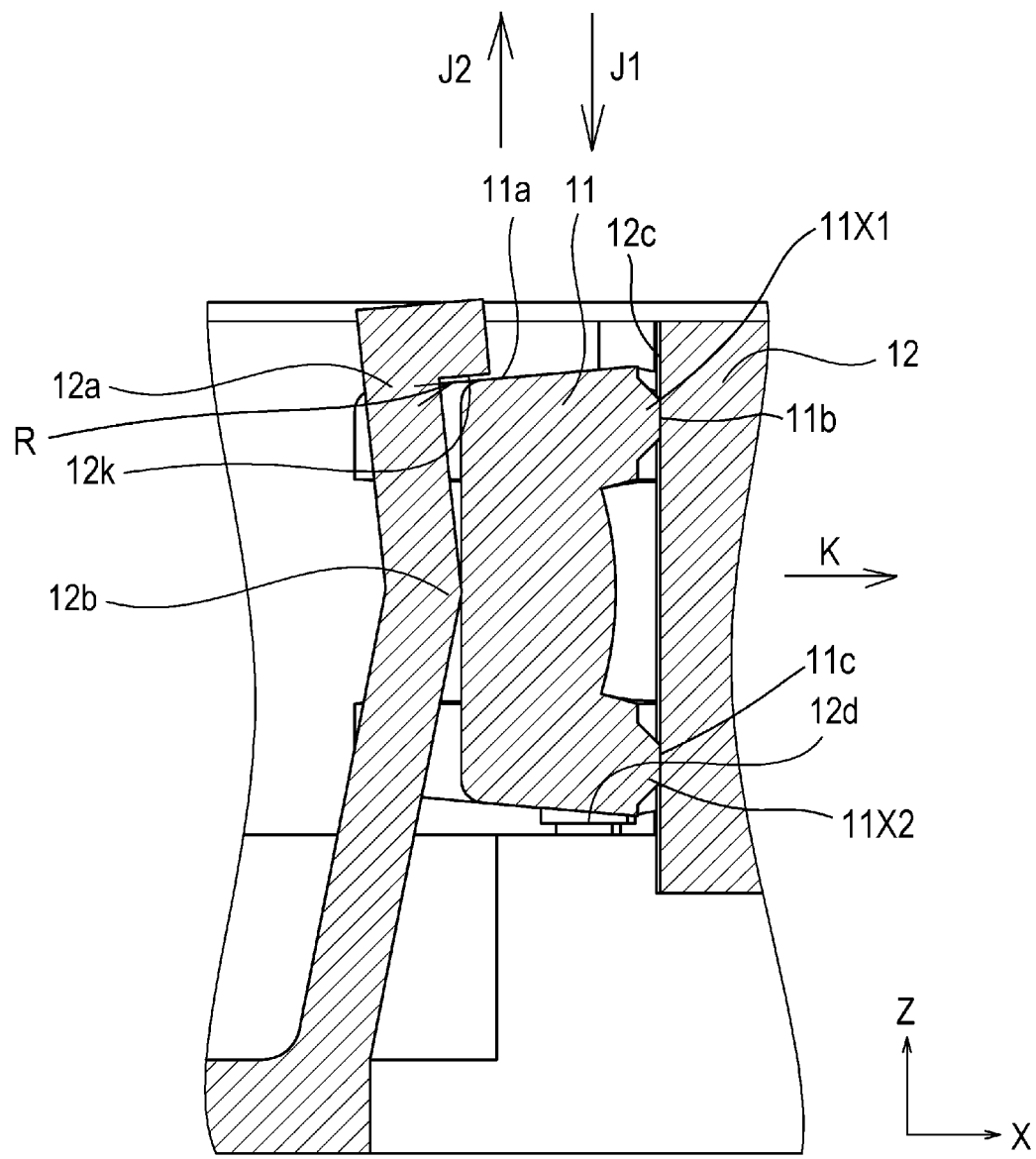
FIG. 5 is an enlarged sectional view of a combination of the springy retaining portion, fθ lens, and its adjacencies, in the second embodiment, to show the method for keeping the fθ lens fixed to the casing (optical box) of the optical scanning device.

FIG. 5 is an enlarged sectional view of the fθ lens 11 and its adjacencies in the second embodiment of the present invention. It is for showing the method for fixing the fθ lens 11 to an optical box 12. The optical scanning device in this embodiment has the fθ lens 11, an optical box 12, and a springy retaining portion 12a which is one of integral parts of the optical box 12.

The fθ lens 11 has a pair of X referential surfaces 11b and 11c, as "bumping surfaces", which are on the most downstream side of the fθ lens 11 in terms of the direction indicated by an arrow mark K, and which come into contact with the optical box 9 as the fθ lens 11 is placed in the optical box 12. The X referential surfaces 11b and 11c are the surfaces of a pair of protrusions 11X1 and 11X2, respectively, which are protrusive in the direction indicated by the arrow mark K which is parallel to the optical axis of the fθ lens 11. The optical box 12 has an X referential surface 12c, as a "catching surface", which catches the X referential surfaces 11b and 11c as the fθ lens 11 is inserted into the optical box 12. Further, the fθ lens 11 is fixed, and remains fixed, to the optical box 12 by being pressed by the pressing portion 12b of the springy retaining portion 12a in the arrow mark X direction.

As for the means for preventing the fθ lens 11 from slipping out of the optical box 12, the optical box 12 is provided with a retaining portion 12k, which opposes the top surface 11a of the fθ lens 11. A combination of the retaining portion 12k, as the end portion of the springy retaining portion 12a, and the top surface 11a of the fθ lens 11, regulates the amount by which the fθ lens 11 is allowed to move in the direction indicated by an arrow mark J2, which is the opposite direction from the direction, indicated by an arrow mark J1, in which the fθ lens 11 is inserted into the optical box 12.

The optical box 12 has a Z referential surface 12d, as a "positioning portion", which precisely positions the fθ lens 11 in terms of the direction parallel to the direction indicated by the arrow mark J1, in which the fθ lens 11 is inserted into the optical box 12 when the optical scanning device 101 is assembled. In terms of the direction indicated by the arrow mark J1 (also, arrow mark Z) in which the fθ lens 11 is inserted into the optical box 12, there is provided roughly 0.1-0.2 mm of gap R (clearance) between the retaining portion 12k of the springy retaining portion 12a and the top surface 11a of the fθ lens 11 when the fθ lens 11 is in contact with the Z referential surface 12d of the optical box 12. Thus, the fθ lens 11 is not subjected to a force directed in parallel to the arrow mark Z direction, as in the first embodiment. Therefore, it does not occur that the fθ lens 11 is unexpectedly subjected to moment. Therefore, it is possible to keep the fθ lens 11 precisely fix the optical box 12.

The pressing portion 12b of the springy retaining portion 12a is a different portion of the springy retaining portion 12a from the retaining portion 12k of the springy retaining portion 12a. Further, the optical scanning device 101 is designed so that if the fθ lens 11 outwardly shifts, the top surface 11a of the fθ lens 11 comes into contact with the retaining portion 12k. In this embodiment, therefore, the fθ lens 11 does not need to be provided with a portion (equivalent to protrusion 7a in first embodiment) dedicated to the retention of the fθ lens 11, unlike in the first embodiment.

By the way, it is recommendable to elastically bend the springy retaining portion 12a in the opposite direction from the arrow mark X direction to widen the opening between the springy retaining portion 12a and the X referential surface 12c before the insertion of the fθ lens 11 into the optical box 12.

Figure 6:
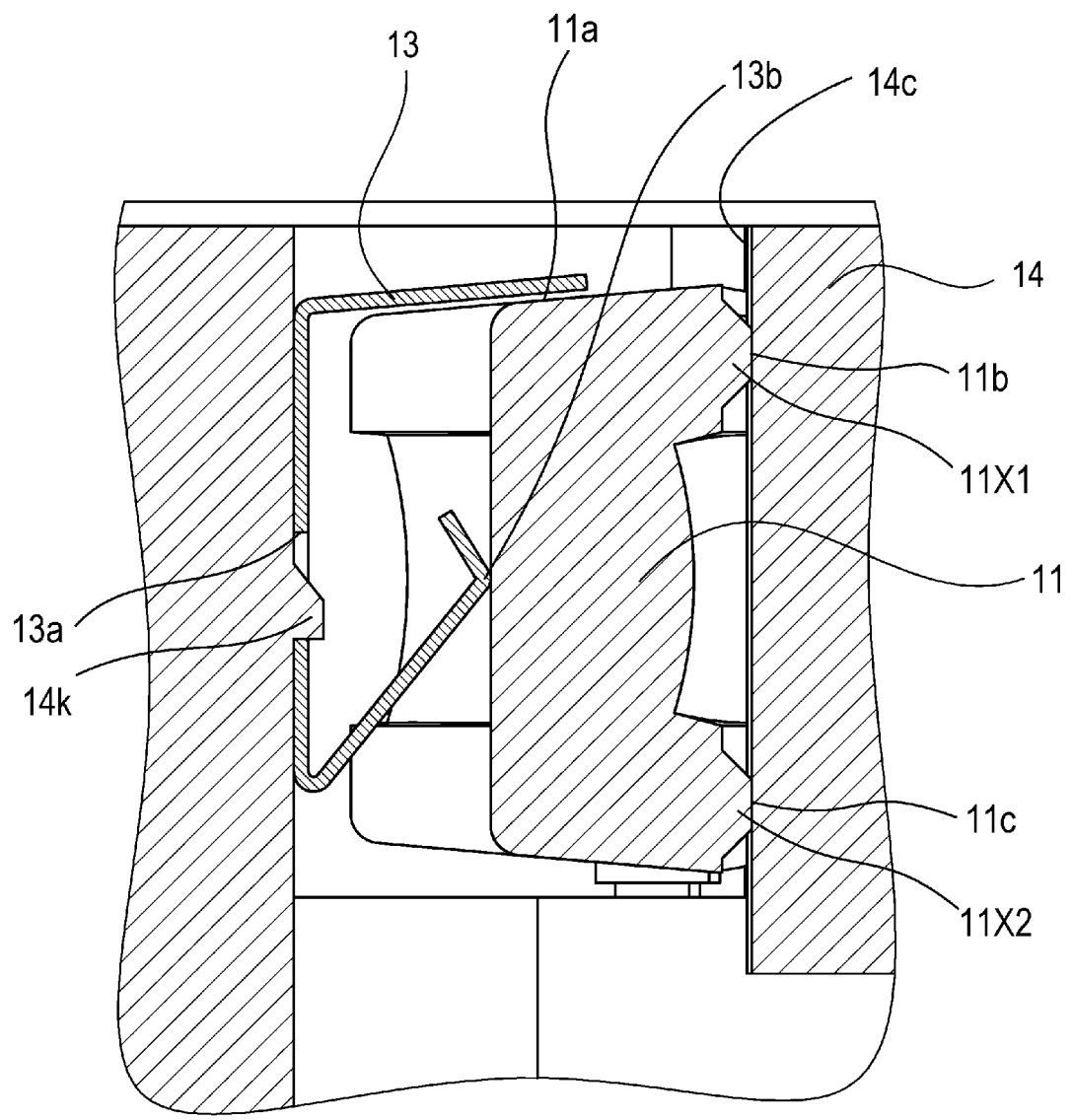
FIG. 6 is an enlarged sectional view of a combination of the springy retainer spring, fθ lens, and its adjacencies, in one of the modified versions of the second embodiment, to show the method for keeping the fθ lens fixed to the casing (optical box) of the optical scanning device.

FIG. 6 is an enlarged sectional view of the fθ lens 11 and its adjacencies in one of modifications of this embodiment. It shows the method for fixing the fθ lens 11 to the optical box 14 in this embodiment. A springy member 13 is not one of the integral parts of the optical box 14. The method for fixing the fθ lens 11 to the optical box 14 is the same as those in the preceding embodiments, and therefore, is not described here. By the way, the hole 13a and pressing portion 13b of the springy member 13 are the same in function as the hole 13a and pressing portion 10b of the springy member 10, respectively. Further, the protrusion 14k and X referential surface 14c of the optical box 14 are the same in function as the protrusion 9k and X referential surface 9c of the optical box 9, respectively.

As described above, the fθ lens 11 is prevented from slipping out of the optical box 14 by the top surface of the fθ lens 11. Therefore, it is unnecessary to provide the fθ lens 11 with a portion shaped to prevent the fθ lens 11 from slipping out of the optical box 14 in the arrow mark Z direction. Otherwise, this modified version of the second embodiment is similar in effect as the first embodiment.

According to the structural design of the optical scanning device in this embodiment, it is possible to precisely position, and keep precisely positioned, the fθ lens 7 relative to the optical box 8 even if the optical scanning device is subjected to a substantial amount of physical impact during the shipment of the device.

Embodiment 3

Next, the optical scanning device in the third embodiment of the present invention is described.
[Optical Scanning Device]
part (a) of FIG. 7 is a perspective view of the optical scanning device 1010. Part (b) of FIG. 7 is a plan view of the optical scanning device 1010. The optical scanning device 1010 has an optical box 80, which is a boxy shell. The optical box 80 holds at least an anamorphic collimator lens 20 and an fθ lens 70 (scanning lens). In the case of this optical scanning device, a laser unit 10 as a "light source", the anamorphic collimator lens 20, and a deflecting device 40 are disposed within the optical box 80. The deflecting device 40 has a rotational polygonal mirror 30 which deflects the beam of light emitted by the laser unit 10, in such a manner that the beam is made to oscillatorily sweep (scan) the object toward which it is aimed. The laser unit 10 (semiconductor laser unit) is such a unit that has a semiconductor laser which emits a beam of laser light, and an iris which shapes the beam in a preset pattern.

The anamorphic collimator lens 20, as the "first optical system", is such a lens that comprises at least one lens and focuses the beam of light on the reflective surface of the rotational polygonal mirror 30, in a pattern of a straight line. In this case, the anamorphic collimator lens 20 is an integration of a collimator lens and a cylindrical lens. The deflecting device 40 is a device for rotationally driving the rotational polygonal mirror 30. Further, the optical scanning device 1010 has a BD lens and a signal detection sensor 60. The fθ lens 70, which functions as the "second optical system" comprises at least one lens. It focuses the beam of light deflected by the deflecting device 40, on the surface aimed at by the deflecting device 40.

As a beam of laser light is emitted from the laser unit 10, it is shaped in a preset pattern. Then, it is converted by the anamorphic collimator lens 20 into such a beam that is roughly parallel or convergent in terms of the primary scan direction, and convergent in terms of the secondary scan direction. Then, the beam of laser light is focused on the reflective surface of the rotational polygonal mirror 30, in such a manner that it linearly extends in the primary scan direction. Then, this focused beam of laser light is deflected by the rotating rotational polygonal mirror 30 in such a manner to oscillate, and enters the BD lens 50. As it transmits through the BD lens 50, it enters the signal detection sensor 60. The timing with which this beam of laser light is detected by the signal detection sensor 60 is the timing with which the peripheral surface of the photosensitive drum 103 begins to be exposed.

Next, the beam of laser light enters the fθ lens 70. The optical scanning device is designed so that the fθ lens 70 focuses the beam of laser light on the peripheral surface of the photosensitive drum 103 so that the beam forms a spot on the peripheral surface of the photosensitive drum 103, and also, so that the spot remains stable in the speed with which it moves in a manner to scan the peripheral surface. In order to provide the fθ lens 70 with the above-described characteristics, the fθ lens 70 is formed aspherical. After the beam of laser light transmits through the fθ lens 70, it comes out of the optical box 80, and scans the peripheral surface of the photosensitive drum 103 while remaining focused on the peripheral surface of the photosensitive drum 103.

Since the rotational polygonal mirror 30 is being rotationally driven, the beam of laser light is oscillatorily deflected by the rotational polygonal mirror 30, so that the peripheral surface of the photosensitive drum 103 is scanned by the beam of laser light in the primary scan direction. While the peripheral surface of the photosensitive drum 103 is scanned by the beam of laser light, the photosensitive drum 103, which is cylindrical, is being rotationally driven about its axis. Therefore, the peripheral surface of the photosensitive drum 103 is scanned also in the secondary scan direction. This is how an electrostatic latent image is effected on the peripheral surface of the photosensitive drum 103.

Next, referring to FIGS. 8 and 9, the structural arrangement for allowing the fθ lens 70 to be smoothly inserted into the optical box 80 and keeping the fθ lens 70 fixed to the optical box 80 is described. FIG. 8 is a sectional view of the optical scanning device in this embodiment at a plane A-A in part (b) of FIG. 7. It shows the relationship between the fθ lens 70 and a pair of springy retaining portions 80a1 and 80a2. FIG. 9 is a plan view of a pair of the Z referential surface 80e1 and 80e2 of the optical box 80 and the pair of springy retaining portions 80a1 and 80a2 of the optical box 80, as seen from the direction indicated by an arrow mark C in part (a) of FIG. 7, without the presence of the fθ lens 70. It shows the relationship between the pair of Z referential surfaces 80a1 and 80a2 and pair of springy retaining portions 80a1 and 80a2.

The pair of springy retaining portions 80a1 and 80a2 are integral parts of the optical box 80. The fθ lens 70 remains fixed to the optical box 80 by being pressed in the direction indicated by the arrow mark X direction (FIG. 7; front surface-to-rear surface direction of sheet on which FIG. 8 is) by the pair of springy retaining portions 80a1 and 80a1. Referring to FIG. 8, the fθ lens 70 remains pressed upon the X referential surfaces 80d1 and 80d2 of the optical box 80 by the pair of springy retaining portions 80a1 and 80a2. The pair of X referential surfaces 80d1 and 80d2 are flat (not stair-stepped) and parallel to the arrow mark Z direction. In terms of the direction parallel to the arrow mark Z direction, the fθ lens 70 is precisely positioned by being placed in contact with a pair of Z referential surfaces 80e1 and 80e2, with which the optical box 80 is provided.

Next, referring to FIG. 10, the relationship between the fθ lens 70 and the pair of springy retaining portions 80a1 and 80a2 is described. FIG. 10 is a sectional view of a combination of the fθ lens 70 and springy retaining portion 80a1, and their adjacencies, at a plane B-B in part (b) of FIG. 7. It shows the positional relationship between the fθ lens 70 and springy retaining portion 80a1. Although the optical box 80 has two springy retaining portions 80a1 and 80a2, the two are the same in shape and the positional relationship with the fθ lens 70. Here, therefore, only the relationship between the springy retaining portion 80a1 and fθ lens 70 is described.

The fθ lens 70 has a pair of protrusions 70a1 and 70a2. The protrusion 70a1 is protrusive in the opposite direction from the arrow mark X direction, whereas the protrusion 70a2 is protrusive in the opposite direction from the arrow mark Z direction.

The optical box 80 has a protrusion 80Z1, which is protrusive in the arrow mark Z direction and functions as a "positioning portion". The protrusion 80Z1 precisely positions the fθ lens 70 in terms of the direction which is indicated by an arrow mark J, and in which the fθ lens 70 is inserted into the optical box 80 to be fixed to the optical box 80. The top surface of the protrusion 80Z1 is the Z referential surface 80e1.

The optical box 80 has a springy retaining portion 80a1, which has a protrusion 80b1, which is protrusive in the arrow mark X direction. The protrusion 80b1, as a "regulating portion", with which the optical box 80 is provided, regulates the amount by which the fθ lens 70 is allowed to move in the opposite direction from the direction which is indicated by the arrow mark J, and in which the fθ lens 70 is inserted into the optical box 80.

As the fθ lens 70 is inserted into the optical box 80, the protrusion 70a1 with which the fθ lens 70 is provided engages with the springy retaining portion 80a1. The direction, in terms of which the movement of the fθ lens 70 is regulated, is the secondary scan direction M. It is the engagement between the protrusion 70a1, as an "engaging portion", of the fθ lens 70, and the protrusion 80b1 of the springy retaining portion 80a1 that prevents the fθ lens 70 from slipping out of the optical box 80 in the arrow mark Z direction.

The optical scanning device is structured so that when the Z referential surface 70b1 of the fθ lens 70 is in contact with the referential surface 80e1 of the optical box 80, there is 0.2 mm of clearance β2 between the fθ lens 70 and optical box 80 (between protrusion 70a1 of fθ lens 70 and protrusion 80b1 of springy retaining portion 80a1) in terms of the arrow mark Z direction. That is, the pressure applied to the fθ lens 70 by the protrusion 80b1 of the springy retaining portion 80a works only in the arrow mark X direction. Thus, it is ensured that the springy retaining portion 80a presses, and keeps pressed, the X referential surface 70X of the fθ lens 70, on the X referential surface 80d1 of the optical box 80. Therefore, it is possible to precisely dispose the fθ lens 70 in a desired position.

Further, the fθ lens 70 has a slanted surface 70g1, which is on the opposite side of the fθ lens 70 from the X referential surface 70X, and along which the springy retaining portion 80a1 is guided as the fθ lens 70 is inserted into the optical box 80. In terms of the direction in which the fθ lens 70 is inserted into the optical box 80, the slanted surface 70g1 is tilted upstream. Thus, when the fθ lens 70 is inserted into the optical box 80 to be attached to the optical box 80, the slanted surface 70g1 comes into contact with the lens guiding slanted surface 80g1 of the optical box 80. Therefore, the fθ lens 70 is smoothly (without hanging up at top portion of springy retaining portion 80a) guided into the optical box 80 to be precisely disposed in the optical box 80.

Next, referring to FIG. 11, how the anamorphic collimator lens 20 is attached to the optical box 80 is described. Part (a) of FIG. 11 is a perspective view of the portion of the optical scanning device, which is directly related to the present invention, prior to the attachment of the anamorphic collimator lens 20 to the optical box 80. Part (b) of FIG. 11 is a perspective view of the portion of the optical scanning device, which is directly related to the present invention, after the attachment of the anamorphic collimator lens 20 to the optical box 80. The anamorphic collimator lens 20 remains fixed to the optical box 80 by being pressed in the direction indicated by an arrow mark Y by a pair of springy retaining portions 80a3 and 80a4 which are integral parts of the optical box 80.

FIG. 12 is a sectional view of a combination of the springy retaining portion 80a3 and anamorphic collimator lens 20, and their adjacencies, at a plane D-D in part (b) of FIG. 11. The anamorphic collimator lens 20 has a protrusion 20a1 which is protrusive in the opposite direction from the arrow mark Y direction, and a protrusion 20Z1 which is protrusive in the opposite direction from the arrow mark Z direction. The optical box 80 has a protrusion 80Z2 which is protrusive in the arrow mark Z direction. The protrusion 80Z2 which is a "positioning portion" precisely positions the anamorphic collimator lens 20 relative to the optical box 80 in terms of the direction, which is indicated by the arrow mark J and in which the anamorphic collimator lens 20 is inserted into the optical box 80. The top surface of the protrusion 80Z2 is the Z referential surface 80f1.

Regarding the positioning of the anamorphic collimator lens 20 in terms of the arrow mark Z direction, as the anamorphic collimator lens 20 is inserted into the optical box 80 to be attached to the optical box 80, the referential surface 20b1 of the anamorphic collimator lens 20 comes into contact with the referential surface 80f1 of the optical box 80, whereby the anamorphic collimator lens 20 is precisely positioned in terms of the arrow mark Z direction.

As long as the image forming apparatus 110 is in the normal usage, the fθ lens 70 remains precisely positioned relative to the referential surfaces 20b1 and 80f1 by the friction generated between the anamorphic collimator lens 20 and optical box 80 by the pressure from the springy retaining portion 80a3.

The springy retaining portion 80a3 has a protrusion 80b3 which is protrusive in the direction indicated by the arrow mark Y. The protrusion 80b3, as a "regulating portion", with which the optical box 80 is provided regulates the amount by which the anamorphic collimator lens 20 is allowed to move in the opposite direction from the direction which is indicated by the arrow mark J in FIG. 10, and in which the anamorphic collimator lens 20 is inserted into the optical box 80 to be attached to the optical box 80. As the anamorphic collimator lens 20 is inserted into the optical box 80, the protrusion 20a1 of the anamorphic collimator lens 20 engages with the protrusion 80b3 of the springy retaining portion 80a3. The direction in which the movement of the anamorphic collimator lens 20 is regulated by the protrusion 80b3 is the secondary scan direction M.

As for the means for preventing the anamorphic collimator lens 20 from slipping out of the optical box 80 in the arrow mark Z direction, the anamorphic collimator lens 20 is prevented from slipping out of the optical box 80 by a combination of the protrusion 20a1 of the anamorphic collimator lens 20 and the protrusion 80b3 of the springy retaining portion 80a3. There is provided 0.1 mm of clearance β1 between the protrusion 20a1 of the anamorphic collimator lens 20 and the protrusion 80b3 of the springy retaining portion 80a3.

The clearance β1 provided between the anamorphic collimator lens 20 and optical box 80 is different in amount from the clearance β2 provided between the fθ lens 70 and optical box 80; the clearance β1 is made smaller than the clearance β2, for the following reason. If the amount by which the anamorphic collimator lens 20 is allowed to move in the optical system used in this embodiment is the same as the amount by which the fθ lens 70 is allowed to move in the optical system in this embodiment, the amount by which the light spot formed on the peripheral surface of the photosensitive drum 103 by the anamorphic collimator lens 20 moves on the peripheral surface of the photosensitive drum 103 is greater than the amount by which the light spot formed on the peripheral surface of the photosensitive drum 103 by the fθ lens 70 moves on the peripheral surface of the photosensitive drum 103.

Further, the optical scanning device is designed so that the direction in which the anamorphic collimator lens 20 is allowed to move by the clearance β1, and the direction in which the fθ lens 70 is allowed to move by the clearance β2 are opposite in the direction in which the light spot formed on the peripheral surface of the photosensitive drum 103 by them moves on the peripheral surface of the photosensitive drum 103. If the anamorphic collimator lens 20 and fθ lens 70 move in the direction to move away from the protrusion 80Z2 and 80Z1, for example, the direction in which the light spot which the beam of light is made to form on the peripheral surface of the photosensitive drum 103, as a "surface to be scanned", by the anamorphic collimator lens 20 moves is opposite from that by the fθ lens 70.

In this embodiment, the two lenses 20 and 70 are held to the optical box 80 so that they are allowed to move in the same direction from the referential surface. If the amount by which the anamorphic collimator lens 20 is allowed to move is the same as the amount by which the fθ lens 70 is allowed to move; the amount by which the light spot which the beam of light is made to form on the peripheral surface of the photosensitive drum 103 by the anamorphic collimator lens 20 moves as the anamorphic collimator lens 20 moves is α1, and the amount by which the light spot which the beam of light is made to form on the peripheral surface of the photosensitive drum 103 by the fθ lens 70 moves as the fθ lens 70 moves is α2; and the amounts by which the anamorphic collimator lens 20 and fθ lens 70 are regulated in their movement by the protrusion 80b1 are β1 and β2 (FIGS. 2 and 10), both inequality (α1>α2) and inequality (β2>β1) are satisfied, or both inequality (α2>α1) and inequality (β1>β2) are satisfied.

Ordinarily, it rarely occurs that as an optical scanning device is subjected to some type of impact, only one of the lenses move. That is, if an optical scanning device is subjected to impacts, both lenses move in the same direction. In the case of an optical scanning device structured as the one in this embodiment, the direction in which the light spot which the beam of light is made to form on the peripheral surface of the photosensitive drum 103 by one of the two lenses is made to move by the movement of the lens is opposite from the light spot which the beam of light is made to form on the peripheral surface of the photosensitive drum 103 by the other lens is made to move by the movement of the lens. Therefore, the movement of the light spot which will be caused by the movement of one lens is cancelled by the movement of the light spot which will be caused by the movement of the other lens.

Embodiment 4

FIG. 14 is a sectional view of a combination of the springy retaining portion 80a1 and fθ lens 70, and its adjacencies, in the optical scanning device in the fourth embodiment of the present invention. In the third embodiment, the springy retaining portion 80a1 is utilized to prevent the fθ lens 70 from slipping out of the optical box 80. In this embodiment, a protrusion 80h1 (regulating portion) with which the optical box 80 is provided is used as a retainer for the fθ lens 70. In this case, the fθ lens 70 itself is the object of engagement by the protrusion 80h1. In this embodiment, the fθ lens 70 is not provided with a protrusion such as the protrusion 70a1 which is protrusive in the opposite direction from the arrow mark X direction. Instead, it is provided with a protrusion 70Z1 which is protrusive in the opposite direction from the arrow mark Z direction. Further, the optical box 80 is provided with a protrusion 80Z1 which is protrusive in the arrow mark Z direction, and the top surface of which makes up a Z referential surface 80e1. The springy retaining portion 80a1 has a protrusion 80b1 which is protrusive in the arrow mark X direction.

The only role of the protrusion 80b1 of this springy retaining portion 80a1 is to press the fθ lens 70. The function of preventing the fθ lens 70 from slipping out of the optical box 80 is taken away from the protrusion 80b1 and given to the protrusion 80h1. That is, the optical scanning device is designed so that it does not occur that when the optical scanning device is subjected to impacts, the springy retaining portion 80a1 is subjected to an excessive amount of load. Further, as the fθ lens 70 is inserted into the optical box 80, the springy retaining portion 80a1 is flexibly bent, and remains flexibly bent thereafter. Therefore, the amount of the clearance is also affected by the amount by which the springy retaining portion 80a1 is flexed. In this embodiment, however, the optical scanning device is provided with the protrusion 80h1, as a fθ lens 70 retainer, which is not a part of the springy retaining portion 80a1. Therefore, the amount of the clearance is not affected by the flexing of the springy retaining portion 80a1. Therefore, it is possible to maintain a preset amount of clearance.

According to the present invention, an optical scanning device can be minimized in the amount by which the beam of light projected from the device misses the intended point on the peripheral surface of the photosensitive drum even if the anamorphic collimator lens 20 and fθ lens 70 are displaced in the same direction by the physical impacts to which the device is subjected during the shipment of the device, or in the like situation. That is, with the employment of an optical scanning device such as the optical scanning device 1010, even if the lens of the beam entry system of the optical scanning device, and the lens of the scanning system of the optical scanning device, are similarly displaced in the same direction during the shipment of the optical scanning device (image forming apparatus) or in the like situation, it is possible to form an image which is not significantly low quality.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications Nos. 2015-225424 filed on Nov. 18, 2015 and 2015-231242 filed on Nov. 27, 2015, which are hereby incorporated by reference herein in their entirety.

What is claimed is:

1. A optical scanning apparatus comprising:
a light source;
a deflector configured to scanningly deflect a beam emitted from said light source;
a scanning lens configured to image the beam deflected by said deflector on a surface to be scanned;
a casing accommodating said light source, said deflector and said scanning lens; and
an elastic member urging said scanning lens toward said casing in a direction of an optical axis,
wherein said scanning lens is provided with an abutment surface at a beam emergent side of said scanning lens, said abutment surface abutting to said casing, and is provided with a limiting portion at a side opposite from a beam emergent side, said limiting portion limiting movement of said scanning lens in a direction opposite to a assembling direction of said scanning lens,
wherein said elastic member as well as said limiting portion limits the movement of said scanning lens in the direction opposite to the assembling direction of said scanning lens, and
wherein in a state that said scanning lens contacts a positioning portion of said casing with respect to the assembling direction, a gap is provided between said elastic member and said limiting portion with respect to the assembling direction.

2. An apparatus according to claim 1, wherein said elastic member is a snap fit member integrally formed with said casing.

3. An optical scanning apparatus comprising:
a light source;
a deflector configured to scanningly deflect a beam emitted from said light source;
a scanning lens configured to image the beam deflected by said deflector on a surface to be scanned;
a casing accommodating said light source, said deflector and said scanning lens; and
an elastic member urging said scanning lens toward said casing in a direction of an optical axis,
wherein said scanning lens is provided with an abutment surface at a beam emergent side of said scanning lens, said abutment surface abutting to said casing, and
wherein a free end portion of said elastic member and a top surface of said scanning lens limit movement of said scanning lens in a direction opposite a assembling direction of said scanning lens, and
wherein in a state that said scanning lens contacts a positioning portion of said casing with respect to the assembling direction, a gap is provided between the free end portion of said elastic member and the top surface of said scanning lens with respect to the assembling direction.

4. An apparatus according to claim 3, wherein said elastic member is a snap fit member integrally formed with said casing.

5. An optical scanning apparatus comprising:
a light source;
a deflector configured to scanningly deflect a beam emitted from said light source, said deflector including a rotatable polygonal mirror;
a first optical system including at least one lens and configured to direct the beam to a reflecting surface of said rotatable polygonal mirror;
a second optical system including at least one lens, said second optical system being configured to image the beam deflected by said deflector on a surface to be scanned; and
a casing holding at least said first optical system and said second optical system;
wherein said casing is provided with positioning portions provided at positions opposing said first optical system and said second optical system with respect to assembling directions of said lenses, respectively, and configured to position said lenses, said casing is provided with limiting portions at positions opposing said first and second optical systems with respect to the directions opposite the assembling directions, respectively, and configured to limit movement of the lenses of said first and optical systems;
wherein the lenses of said first and second optical systems are provided with engaging portions engaged with limiting portions, respectively, and
wherein a moving direction of the beam on the surface to be scanned by movement of said lens of said first optical system away from said positioning portion is opposite a moving direction of the beam on the surface to be scanned by a movement of said lens of said second optical system away from said positioning portion.

* * * * *